(12) United States Patent
Vukovich et al.

(10) Patent No.: US 6,647,816 B1
(45) Date of Patent: Nov. 18, 2003

(54) ELECTRICALLY ACTUATED SYNCHRONIZER FOR A VEHICLE TRANSMISSION

(75) Inventors: William Vukovich, White Lake, MI (US); Melissa Koenig, Howell, MI (US); R. Keith Martin, Imlay City, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/132,771

(22) Filed: Apr. 25, 2002

(51) Int. Cl.$^7$ ................................................ F16H 3/38
(52) U.S. Cl. ........................... 74/339; 74/355; 192/84.6
(58) Field of Search .......................... 74/339, 335, 355; 192/84.6, 84.92, 48.2, 48.91

(56) References Cited

U.S. PATENT DOCUMENTS

| | | | | |
|---|---|---|---|---|
| 4,561,520 A | * | 12/1985 | Fogelberg | 180/247 |
| 4,603,596 A | | 8/1986 | Akashi et al. | 73/336 R |
| 4,622,866 A | * | 11/1986 | Ito et al. | 477/122 |
| 4,770,280 A | | 9/1988 | Frost | 192/53 F |
| 4,802,384 A | | 2/1989 | Schwarz et al. | 74/745 |
| 4,817,470 A | | 4/1989 | Muller et al. | 74/866 |
| 5,348,517 A | * | 9/1994 | Dick | 475/210 |
| 5,357,821 A | | 10/1994 | Haka et al. | 74/335 |
| 5,527,225 A | * | 6/1996 | Dick | 474/12 |
| 5,560,249 A | | 10/1996 | Nellums | 74/339 |
| 5,653,143 A | | 8/1997 | Langevin | 74/348 |
| 5,771,477 A | | 6/1998 | Showalter et al. | 701/51 |
| 5,836,207 A | | 11/1998 | Spooner et al. | 74/335 |
| 5,931,055 A | | 8/1999 | Huber et al. | 74/745 |
| 6,076,430 A | | 6/2000 | Huber et al. | 74/745 |
| 6,145,398 A | | 11/2000 | Bansbach et al. | 74/335 |
| 6,164,149 A | | 12/2000 | Ohmori et al. | 74/336 R |
| 6,227,063 B1 | | 5/2001 | Ohmori et al. | 74/335 |
| 6,251,045 B1 | | 6/2001 | Oliveira et al. | 477/124 |
| 6,302,253 B1 | * | 10/2001 | Link et al. | 192/55.61 |
| 6,499,370 B2 | * | 12/2002 | Bowen | 74/330 |

FOREIGN PATENT DOCUMENTS

| | | | | |
|---|---|---|---|---|
| EP | 1108583 A1 | * | 6/2001 | B60K/6/02 |
| JP | 08200397 A | * | 8/1996 | F16D/23/06 |

* cited by examiner

Primary Examiner—Sherry Estremsky
Assistant Examiner—Tisha D. Lewis
(74) Attorney, Agent, or Firm—Warn, Burgess & Hoffman, P.C.; Greg Dziegielewski

(57) ABSTRACT

A synchronizer assembly for a vehicle transmission, where the synchronizer assembly is electrically actuated during a shift. The assembly includes a sleeve having an inner surface and an outer surface. A rotor is rotatably mounted to the outer surface of the sleeve and a shift collar is axially mounted to the inner surface of the sleeve. The rotor is threadably coupled to the shift collar so that when the rotor rotates, the shift collar moves in an axial direction relative to the sleeve. An armature coil is electrically coupled to the rotor to cause it to rotate. Keys are rigidly secured to the shift collar to maintain the orientation of the shift collar while it moves. The shift collar locks a shift gear to the transmission output shaft during a shift.

16 Claims, 1 Drawing Sheet

ELECTRICALLY ACTUATED SYNCHRONIZER FOR A VEHICLE TRANSMISSION

BACKGROUND OF THE INVENTION

1. Field of the Invention

This invention relates generally to a synchronizer for a vehicle transmission and, more particularly, to a synchronizer for a vehicle transmission, where the synchronizer is electrically actuated.

2. Discussion of the Related Art

As is well understood in the art, vehicles that are powered by an internal combustion engine require a transmission for shifting between gears to effectively transmit the power generated by the engine to the vehicle wheels. Modern transmissions for both manually shifted and automatically shifted gears require precise alignment between the speed of the desired shift gear and the output shaft of the transmission during a shift to prevent gear clashing, and thus gear damage. The desired shift gear is disposed around and is freely rotatable relative to the output shaft when it is not being used to deliver engine power to the output shaft of the transmission. It is necessary to synchronize the rotation of the shift gear with the output shaft of the transmission prior to the gear being engaged to the output shaft to deliver power thereto. In other words, the speed of a mating main shaft gear must be synchronized in speed to the output shaft of the transmission before the gear is engaged to the output shaft.

Synchro-mesh mechanisms or synchronizers are employed in transmissions for this purpose, where multiple synchronizers are required for multiple shift gears. A typical synchronizer includes a n inner hub that is spline mounted to the output shaft and thus rotates therewith. The hub is held in a stationary position on the output shaft between the various shift gears positioned along and freely rotatably relative to the output shaft. The synchronizer also includes an outer sleeve having internal splines that mesh with external splines on the inner hub. Thus, the outer sleeve rotates at the same speed as the output shaft.

A shift fork engages a groove in an outer surface of the outer sleeve and is actuatable to slide the outer sleeve relative to the inner hub on the meshed splines in an axial direction relative to the output shaft. The shift fork is typically driven by a mechanical actuator in a manual transmission and by a hydraulic actuator in an automatic transmission. Longitudinally extending inserts are rigidly mounted to the inner surface of the outer sleeve, and are positioned within cooperating slots on the outer surface of the inner hub.

The synchronizer also includes a blocking ring positioned between the outer sleeve and the inner hub that acts as a clutch to speed up or slow down the shift gear during a shift to match the speed of the shift gear to the speed of the output shaft. When the shift fork causes the outer sleeve to slide on the inner hub during a shift, the inserts move axially toward the blocking ring. The inner splines of the outer sleeve engage outer splines of the blocking ring. The blocking ring includes chamfered teeth along its outer edge that engage with chamfered ends of the internal splines of the outer sleeve. The inner splines of the outer sleeve also engage with straight-cut teeth on the shift gear once the speed of the gear matches the speed of the blocking ring and the sleeve. The blocking ring includes an inner cone surface that engages and fits over a cone-shaped portion of the shift gear. The blocking ring also includes slots in the end for receiving the ends of the inserts.

During a shift, a clutch disengages the input shaft of the transmission from the engine. The shift fork is actuated to cause the outer sleeve to move toward the shift gear to be engaged. As the sleeve moves, the inserts mesh with the slots in the end of the blocking ring. This causes the blocking ring to index properly with the sleeve, which is turning at the speed of the output shaft. As the outer sleeve continues to move, it pushes the blocking ring against the cone portion of the shift gear. The shift gear is unloaded because no engine power is being delivered while the clutch is disengaged. Friction between the cone surfaces of the blocking ring and the shift gear causes the shift gear to begin turning at the same speed as the outer sleeve, and thus the speed of the output shaft. As the sleeve continues to move towards the shift gear, the shift gear starts moving at the same speed as the outer sleeve which allows the splines of the sleeve to engage the straight-cut teeth of the shift gear without clashing. This locks the gear, sleeve, hub and output shaft together. The gear is now engaged with the output shaft, and the clutch is released to allow power to flow through the gear to the output shaft and the drive wheels.

As discussed above, a shift fork is positioned in a groove cut in the outer sleeve to allow the shift fork to slide the sleeve and engage the gear. The shift fork is manually actuated by a hand-operated shift lever in a manual transmission and is hydraulically actuated in an automatic transmission. Such shifting actuators are bulky and require sophisticated linkages that can be improved upon.

SUMMARY OF THE INVENTION

In accordance with the teachings of the present invention, a synchronizer assembly for a vehicle transmission is disclosed, where the synchronizer assembly is electrically actuated during a shift. The assembly includes a sleeve having an inner surface and an outer surface. A rotor is rotably mounted to the outer surface of the sleeve and a shift collar is axially mounted to the inner surface of the sleeve. The rotor is threadably coupled to the shift collar so that when the rotor rotates, the shift collar moves in an axial direction relative to the sleeve. An armature coil is electrically coupled to the rotor to cause it to rotate. Keys are rigidly secured to the shift collar to maintain the orientation of the shift collar while it moves. The shift collar locks a shift gear to the transmission output shaft during a shift.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE EMBODIMENTS

The following discussion of the embodiments of the invention directed to an electrically actuated synchronizer for a vehicle transmission is merely exemplary in nature, and is in no way intended to limit the invention or its applications or uses.

Figure 1:
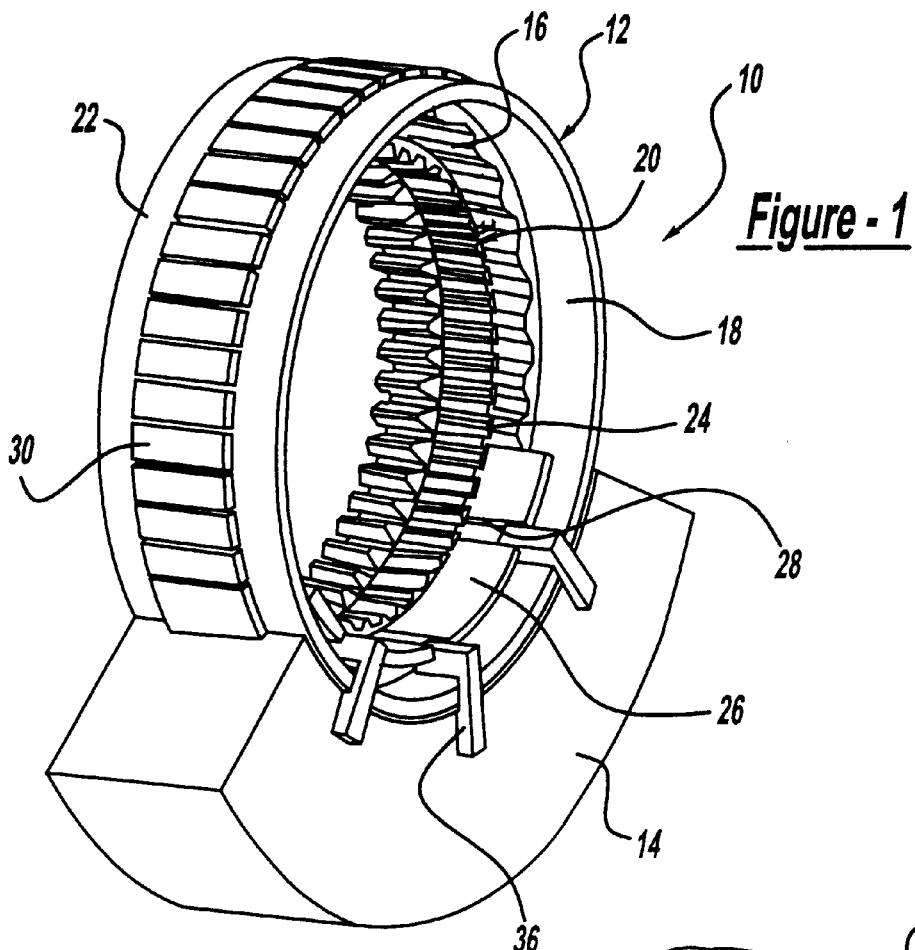
FIG. 1 is a perspective view of an electrically actuated synchronizer assembly for use in a vehicle transmission, according to an embodiment of the present invention.

FIG. 1 is a perspective view of a synchronizer assembly 10 for use in a vehicle transmission, according to an embodiment of the present invention. Synchronizer assemblies are well known in both manual and automatic transmissions for synchronizing the speed of an output shaft of the transmission to the speed of the desired shift gear during a shift, as discussed above. Therefore, the components of the vehicle transmission are not shown in this diagram, but would be well understood to those skilled in the art. As will be discussed in detail below, the synchronizer assembly is electrically actuated to provide speed synchronization between the gear and the output shaft. The electrically actuated design of the synchronizer assembly of the invention replaces the shift forks using manual and hydraulic linkages typically employed in prior art synchronizer designs.

The synchronizer assembly 10 includes a cylindrical synchronizer sleeve 12 having an outer surface 22 and an inner surface 18. The outer surface 22 of the sleeve 12 is rigidly mounted to a coil housing 14 by any device suitable for the purposes described herein. A motor armature coil (not shown) is wound on a suitable core within the housing 14. The sleeve 12 includes splines 16 mounted on the inner surface 18. A shift collar 20 is slidably mounted to the internal surface 18 of the sleeve 12 so that the shift collar 20 is capable of moving in an axial direction relative to the sleeve 12. To allow this movement, the shift collar 20 includes splines 24 that engage and mesh with the splines 16.

A transmission output shaft (not shown) extends through the sleeve 12 and a synchronizer hub (not shown) is positioned between the shaft and the collar 20 as in the known designs. The hub includes splines that mesh with the splines on the output shaft and mesh with the splines 24 so that the hub and shift collar 20 rotate at the same speed as the output shaft, as discussed above. A plurality of keys 26 are rigidly secured to the shift collar 20 and define gaps 28 therebetween. Tabs 36 are mounted to the coil housing 14, and are aligned with the gaps 28 as shown. The keys 26 and the tabs 36 operate in the same manner as the inserts described above so that as the shift collar 20 moves axially relative to the output shaft during a shift, the shift collar 20 is maintained in the proper orientation relative thereto.

A motor rotor 30 is rotatably mounted to the outer surface 22 of the sleeve 12, and is electrically and magnetically coupled to the armature coil. The rotor 30 can be mounted to the sleeve 12 by any technique suitable for the purposes described herein. Threads (not shown) are provided on an internal diameter of the rotor 30 and engage the splines 24 on the shift collar 20. Thus, when the rotor 30 rotates on the sleeve 12, the shift collar 20 moves axially relative to the sleeve 12.

Figure 2:
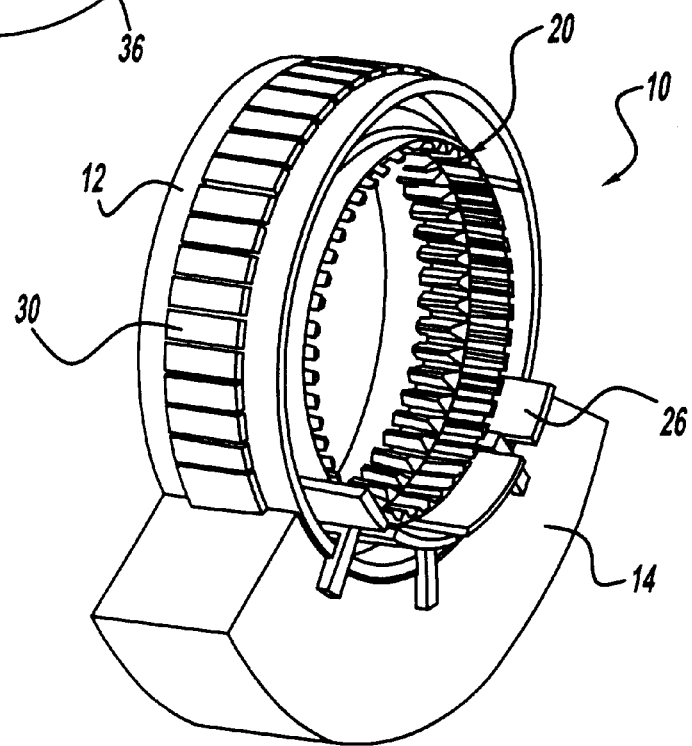
FIG. 2 is a perspective view of the synchronizer assembly shown in FIG. 1 where a shift collar of the synchronizer assembly has been axially shifted to a shift position.

By applying current to the armature coil from a control circuit, such as a TCU, the rotor 30 is caused to rotate on the outer surface 22 of the sleeve 12 to move the shift collar 20. Thus, shift forks are not employed to move the collar 20 in this design. Current flowing in one direction through the coil will cause the rotor 30 to rotate in one direction, and current flowing in an opposite direction through the coil will cause the rotor 30 to rotate in an opposite direction. In this embodiment, rotation of the rotor 30 in the clockwise direction causes the shift collar 20 to move to the left, and rotation of the rotor 30 in the counterclockwise direction causes the shift collar 20 to move to the right. FIG. 2 shows the assembly 10 where the shift collar 20 has been moved to the shift position from the non-shift position shown in FIG. 1.

When a shift is initiated, the shift collar 20 is caused to move towards a blocking ring (not shown) and is engaged therewith in the manner as discussed above. The blocking ring then engages the shift gear (not shown) to cause the shift gear to turn at the same speed as the sleeve 12 and to lock the shift gear to the output shaft through the assembly 10 in the manner discussed above.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A synchronizer for a vehicle transmission, said synchronizer comprising:
    a sleeve including an inner surface and an outer surface;
    a rotor rotatably mounted to the outer surface of the sleeve;
    a shift collar mounted to the inner surface of the sleeve and being mechanically coupled to the rotor; and
    an electric coil electrically coupled to the rotor, said coil being responsive to an electric current so as to cause the rotor to rotate on the sleeve, wherein rotation of the rotor causes the shift collar to move in an axial direction relative to the sleeve.

2. The synchronizer according to claim 1 further comprising a plurality of keys mounted to the shift collar, said plurality of keys defining key gaps therebetween.

3. The synchronizer according to claim 2 further comprising tabs mounted to the inner surface of the sleeve and being aligned with the key gaps, said tabs maintaining the orientation of the shift collar when it moves in the axial direction.

4. The synchronizer according to claim 1 wherein the coil is positioned within a coil housing and the coil housing is mounted to the outer surface of the sleeve.

5. The synchronizer according to claim 1 wherein the rotor is threadably coupled to the shift collar.

6. The synchronizer according to claim 1 wherein the sleeve includes sleeve splines on the inner surface of the sleeve and the shift collar includes shift collar splines that mesh with the sleeve splines.

7. The synchronizer according to claim 1 wherein rotation of the rotor in a clockwise direction moves the shift collar in one axial direction and rotation of the rotor in a counterclockwise direction moves the shift collar in an opposite axial direction.

8. A synchronizer for a vehicle transmission, said synchronizer synchronizing the speed of a shift gear with the speed of an output shaft of the transmission, said synchronizer comprising:
    a cylindrical sleeve including an inner surface and an outer surface, said sleeve including sleeve splines on the inner surface of the sleeve;
    a rotor rotatably mounted to the outer surface of the sleeve;
    a shift collar mounted to the inner surface of the sleeve and being threadably coupled to the rotor, said shift collar including shift collar splines that mesh with the sleeve splines; and
    an electric coil electrically coupled to the rotor, said coil being responsive to an electric current so as to cause the rotor to rotate in either a clockwise or counterclockwise direction on the outer surface of the sleeve, wherein rotation of the rotor in the clockwise direction causes the shift collar to move in one axial direction relative to the sleeve and rotation of the rotor in the counterclockwise direction causes the shift collar to move in an opposite axial direction.

9. The synchronizer according to claim 8 further comprising a plurality of keys mounted to the shift collar, said plurality of keys defining key gaps therebetween.

10. The synchronizer according to claim 9 further comprising tabs mounted to the inner surface of the sleeve and being aligned with the key gaps, said tabs maintaining the orientation of the shift collar when it moves in the axial direction.

11. The synchronizer according to claim 8 wherein the coil is positioned within a coil housing and the coil housing is mounted to the outer surface of the sleeve.

12. A method of synchronizing the speed of a shift gear in a transmission to the speed of an output shaft of the transmission, comprising:

slidably mounting a shift collar to an inner surface of a sleeve;

rotatably mounting a rotor to an outer surface of the sleeve, said rotor being mechanically coupled to the shift collar; and applying a current in a predetermined direction to a coil, said coil being electrically coupled to the rotor so as to cause the rotor to rotate on the sleeve and cause the shift collar to move in an axial direction relative to the sleeve.

13. The method according to claim 12 wherein applying current to the coil in one direction causes the rotor to rotate in a first direction and the shift collar to move in a first direction, and applying current to the coil in an opposite direction causes the rotor to rotate in a second opposite direction and the shift collar to move in a second opposite direction.

14. The method according to claim 12 further comprising maintaining the orientation of the shift collar relative to the output shaft when the shift collar is axially moved.

15. The method according to claim 12 further comprising providing the coil in a coil housing and mounting the coil housing to the outer surface of the sleeve.

16. The method according to claim 12 wherein the rotor is threadaby coupled to the shift collar.

\* \* \* \* \*